(12) United States Patent
Valentine et al.

(10) Patent No.: US 6,175,324 B1
(45) Date of Patent: Jan. 16, 2001

(54) POLICE RADAR DETECTOR

(75) Inventors: Michael David Valentine; Stephen Ray Scholl, both of Cincinnati, OH (US); Harry Joe Gould, Mesa, AZ (US)

(73) Assignee: Valentine Research, Inc., Cincinnati, OH (US)

( * ) Notice: Under 35 U.S.C. 154(b), the term of this patent shall be extended for 0 days.

(21) Appl. No.: 09/425,388

(22) Filed: Oct. 22, 1999

(51) Int. Cl.[7] ........................................... G01S 7/40
(52) U.S. Cl. .................. 342/20; 342/89; 455/227; 455/313; 455/314; 455/315; 455/344; 455/345
(58) Field of Search .................. 342/20, 27, 89, 342/98–103, 175, 192–197; 455/226.1, 227, 228, 313, 314, 315, 344, 345

(56) References Cited

U.S. PATENT DOCUMENTS

| | | |
|---|---|---|
| 5,068,663 | * 11/1991 | Valentine et al. ................ 342/20 |
| 5,461,383 | 10/1995 | Ono et al. . |
| 5,852,417 | 12/1998 | Valentine et al. . |
| 5,856,801 | 1/1999 | Valentine et al. . |
| 5,900,832 | 5/1999 | Valentine et al. . |
| 5,917,441 | 6/1999 | Valentine et al. . |

* cited by examiner

Primary Examiner—Bernarr E. Gregory
(74) Attorney, Agent, or Firm—King & Schickli, PLLC

(57) ABSTRACT

A novel frequency scheme for a police radar detector enables improved sweeping of the X, K, $K_u$ and $K_a$ radar bands. The novel frequency scheme requires two initial frequency conversions for detection of the X, K and $K_a$ radar bands and a single initial frequency conversion for the $K_u$ radar band with single initial frequency conversion being enabled by disabling the second mixer. During sweeping of the X, K and $K_a$ bands, selectable, i.e., upper or lower, sideband suppression is employed to reduce undesired image sidebands and noise prior to the second frequency conversion. In addition, noise at the second IF frequency is reduced to prevent this noise from feeding through the second mixer into the second IF amplifier. During the $K_u$ band sweep, the second mixer is bypassed and shunting of signals at the second IF frequency is disabled so that these signals enter the second IF amplifier.

22 Claims, 3 Drawing Sheets

POLICE RADAR DETECTOR

BACKGROUND OF THE INVENTION

The present invention relates in general to police radar detectors and, more particularly, to police radar detectors and methods of operating police radar detectors wherein an improved frequency scheme enables improved sweeping of the X, K, $K_u$, and $K_a$ radar bands, and also selective sideband suppression during sweeps of the X, K and $K_a$ radar bands.

Police have used radar waves to monitor the speed of motor vehicles for many years. The frequencies currently used throughout the world include: the X band—10.50 gigahertz (Ghz) to 10.55 Ghz; the $K_u$ band—13.40 to 13.50 Ghz; the K band—24.05 Ghz to 24.25 Ghz; and the $K_a$ band—33.40 Ghz to 36.00 Ghz. To alert motorists of the presence of police radar, electromagnetic signals within these radar bands are monitored using a police radar detector which issues an audible and/or visual alert upon detection of a radar signal within one of the bands.

Police radar detectors are basically superheterodyne radio receivers in which the tuning of the receivers is repeatedly swept through the frequencies which are to be received or detected, i.e., the frequencies of the radar bands. A typical superheterodyne radio receiver includes an antenna for receiving electromagnetic signals and a circuit for mixing signals from the antenna and local oscillator (LO) signals to convert the frequency of received electromagnetic signals to the frequency of an intermediate frequency (IF) with the LO being swept in frequency to tune the required frequencies. Incoming electromagnetic signals can then be received at the LO frequency plus or minus the IF frequency, known as upper and lower sidebands, respectively.

Generally, signal reception occurs in only one of these two sidebands and the other sideband or image frequency is suppressed by filtering or phasing to thereby perform single sideband (SSB) reception. SSB operation is usually preferable because it generally delivers improved noise figure relative to double sideband (DSB) operation and also reduces sensitivity in the alternate sideband, thus reducing susceptibility to undesired signals. Sometimes DSB operation is intentionally adopted in the interest of economy or because in some circumstances it can facilitate expanded frequency coverage.

The frequencies used within the police radar detector, including frequencies or swept frequency bands of local oscillators and frequencies of intermediate amplifiers, and the tuning methods, are referred to in the art as frequency schemes and a variety of frequency schemes are known and utilized in police radar detectors. For example, see U.S. Pat. No. 5,068,663; 5,268,689; 5,305,007; and, 5,917,441.

While known frequency schemes are satisfactory for operation of police radar detectors, there is an ongoing need for new and advantageous frequency schemes which improve operation of police radar detectors, reduce costs of manufacturing police radar detectors and/or simplify circuitry or operation of police radar detectors.

SUMMARY OF THE INVENTION

This need is currently met by the invention of the present application wherein a novel frequency scheme for a police radar detector enables improved sweeping of the X, K, $K_u$ and $K_a$ radar bands. The novel frequency scheme requires two initial frequency conversions for detection of the X, K and $K_a$ radar bands and a single initial frequency conversion for the $K_u$ radar band with single initial frequency conversion being enabled by disabling the second mixer of the police radar detector. During sweeping of the X, K and $K_a$ radar bands, selectable sideband suppression, i.e., either upper sideband suppression or lower sideband suppression, is employed to reduce undesired image sidebands and noise prior to the second frequency conversion. In addition, noise at the second intermediate frequency, for example about 725 megahertz (Mhz), is reduced to prevent this noise from feeding through the second mixer into the second IF amplifier. During the $K_u$ radar band sweep, the second mixer is bypassed and shunting of signals at the second IF frequency is disabled so that these signals enter the second IF amplifier.

In accordance with one aspect of the present invention, a police radar detector comprises an antenna for receiving incoming electromagnetic signals. A first local oscillator generates a first local oscillator signal which is swept through a first range of frequencies to sweep the X, K and $K_a$ radar bands and a second range of frequencies to sweep the $K_u$ radar band. A first mixer is coupled to the antenna and the first local oscillator for mixing the incoming electromagnetic signals with the first local oscillator signal to generate first intermediate frequency signals. A second local oscillator generates a second local oscillator signal. A second mixer is coupled to the first mixer for mixing first intermediate frequency signals with the second local oscillator signal to generate second intermediate frequency signals at a second intermediate frequency. Detector circuitry is coupled to the second mixer for detecting received electromagnetic signals within the X, $K_u$, K and $K_a$ radar bands. Signal conditioning and control circuitry selectively enables the second local oscillator when the X, K and $K_a$ radar bands are swept and disables the second local oscillator and bypasses the second mixer when the $K_u$ radar band is swept.

The police radar detector may further comprise a first intermediate frequency amplifier passing signals encompassing the second intermediate frequency and amplifying the first intermediate frequency signals. For this embodiment, the first intermediate frequency amplifier couples the first mixer to the second mixer which then mixes amplified first intermediate frequency signals with the second local oscillator signal. When the second intermediate frequency is about 725 megahertz, the first range of frequencies comprises about 14.310 gigahertz to about 15.160 gigahertz. However, the first range of frequencies may comprise about 14.310 gigahertz to about 15.160 gigahertz for the K and $K_a$ radar bands and a subrange of frequencies comprising about 15.090 gigahertz to about 15.160 gigahertz for the X radar band. The second range of frequencies comprises about 14.125 gigahertz to about 14.225 gigahertz. The second mixer may comprise a 90° hybrid circuit and first and second diodes. For this embodiment, one of the first and second diodes is forward biased by the signal conditioning and control circuitry to bypass the second mixer when the $K_u$ radar band is swept.

The police radar detector preferably further comprises sideband suppression circuitry for selecting an upper sideband signal or a lower sideband signal from the first intermediate frequency signal when the detector is sweeping the X, K and $K_a$ radar bands. For example, when the second intermediate frequency is about 725 megahertz, the upper sideband signal is around 6.050 gigahertz and the lower sideband signal is around 4.600 gigahertz. The sideband suppression circuitry may comprise a varactor controlled by the signal conditioning and control circuitry to select the upper sideband or the lower sideband.

The police radar detector may further comprise a noise suppression circuit which suppresses noise around the second intermediate frequency, for example around 725 megahertz, when the X, K and $K_a$ radar bands are swept. When a noise suppression circuit is provided, it may comprise a diode coupled between the signal conditioning and control circuitry and an input of the second mixer stage, the diode being forward biased when the X, K and $K_a$ radar bands are swept and being reversed biased when the $K_a$ radar band is swept.

In accordance with another aspect of the present invention, a police radar detector comprises an antenna for receiving incoming electromagnetic signals. A first local oscillator generates a first local oscillator signal which is swept through a range of frequencies to sweep the X, K and $K_a$ radar bands. A first mixer is coupled to the antenna and the first local oscillator for mixing the incoming electromagnetic signals with the first local oscillator signal to generate first intermediate frequency signals. A second local oscillator generates a second local oscillator signal. A second mixer is coupled to the first mixer for mixing first intermediate frequency signals with the second local oscillator signal to generate second intermediate frequency signals at a second intermediate frequency. Detector circuitry is coupled to the second mixer for detecting received electromagnetic signals within the X, K and $K_a$ bands. Sideband suppression circuitry suppresses an upper sideband signal or a lower sideband signal from the first intermediate frequency signal when the detector is sweeping the X, K and $K_a$ radar bands. Signal conditioning and control circuitry selectively enables the sideband suppression circuitry for selectively enabling suppression of the upper sideband or the lower sideband.

The police radar detector may further comprise a first intermediate frequency amplifier passing signals encompassing the second intermediate frequency and amplifying the first intermediate frequency signals, the first intermediate frequency amplifier coupling the first mixer to the second mixer which then mixes amplified first intermediate frequency signals with the second local oscillator signal. When the second intermediate frequency is about 725 megahertz, the upper sideband signal is around 6.050 gigahertz and the lower sideband signal is around 4.600 gigahertz. Also, the range of frequencies comprises about 14.310 gigahertz to about 15.160 gigahertz. However, the range of frequencies may comprise about 14.310 gigahertz to 15.160 gigahertz for the K and $K_a$ radar bands and a subrange of the range of frequencies comprising about 15.090 gigahertz to about 15.160 gigahertz for the X radar band.

In the police radar detector, the range of frequencies used to sweep the X, K and $K_a$ bands may comprise a first range of frequencies with the first local oscillator being swept through a second range of frequencies to sweep the $K_u$ radar band, the first intermediate frequency amplifier encompasses the second intermediate frequency and the detector circuitry further detects received electromagnetic signals within the $K_u$ radar band. The signal conditioning and control circuitry further selectively enables the second local oscillator when the X, K and $K_a$ bands are swept and disables the second local oscillator and bypasses the second mixer when the $K_u$ band is swept and wherein the second mixer comprises a 90° hybrid circuit and first and second diodes with one of the first and second diodes being forward biased by the signal conditioning and control circuitry to bypass the second mixer when the $K_u$ band is swept. When the second intermediate frequency is about 725 megahertz, the upper sideband signal is around 6.050 gigahertz and the lower sideband signal is around 4.600 gigahertz. The sideband suppression circuitry may comprise a varactor controlled by the signal conditioning and control circuitry to select the upper sideband or the lower sideband.

It is, thus, an object of the present invention to provide a novel frequency scheme for a police radar detector; to provide a novel frequency scheme for a police radar detector which enables the detector to scan the X, K, $K_u$ and $K_a$ radar bands; to provide a novel frequency scheme for a police radar detector which detects the X, K and $K_a$ radar bands using two initial frequency conversions and the $K_u$ radar band using a single initial frequency conversion performed by disabling the second mixer; and, to provide a novel frequency scheme for a police radar detector which detects the X, K and $K_a$ radar bands and selectively suppresses an upper sideband or a lower sideband.

Other objects and advantages of the invention will be apparent from the following description, the accompanying drawings and the appended claims.

DETAILED DESCRIPTION OF THE INVENTION

Figure 1:
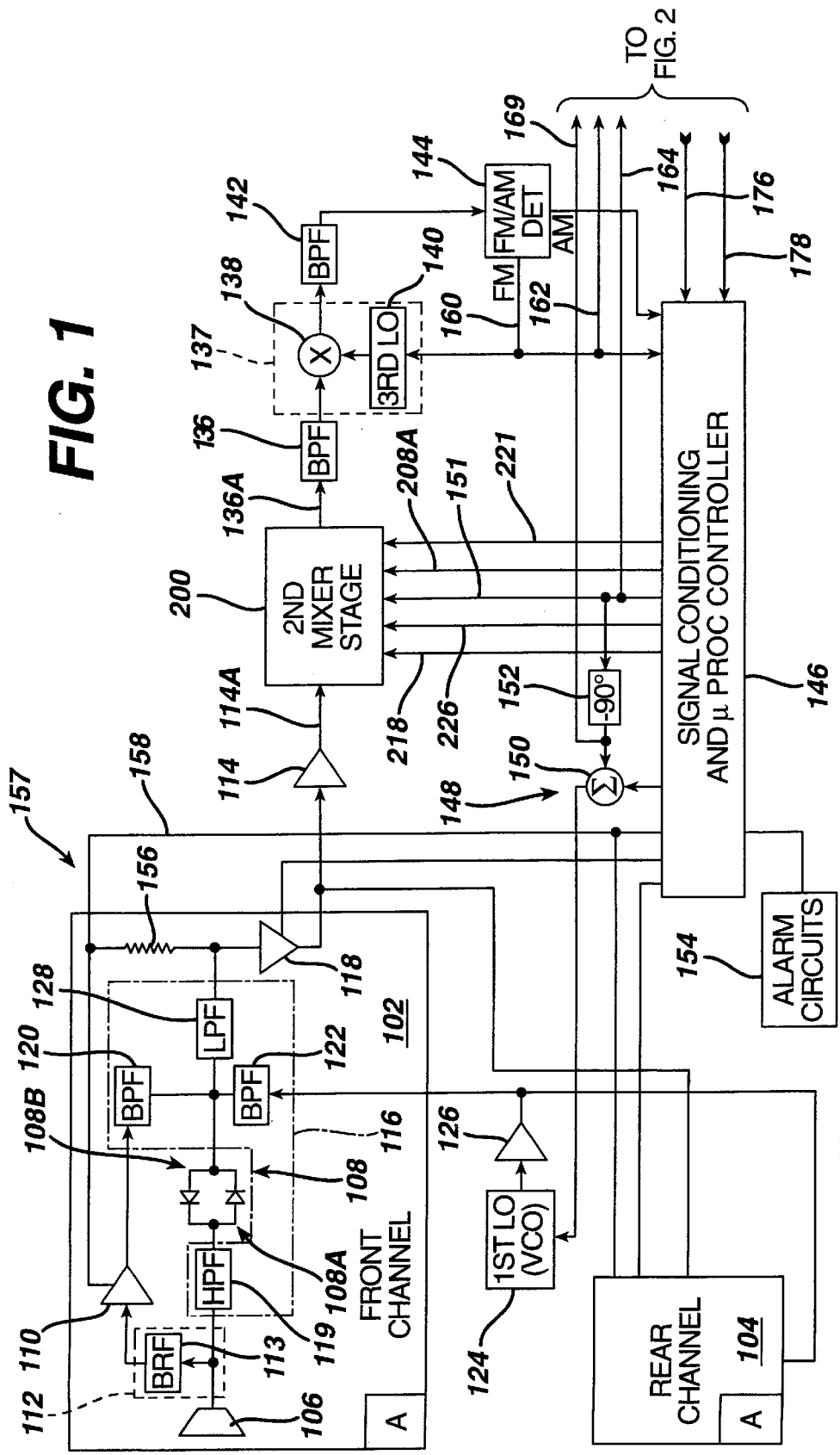
FIG. 1 is a schematic block diagram of a police radar detector for practicing the invention of the present application.

Reference will now be made to FIG. 1 which illustrates, in schematic block diagram form, a police radar detector 100 utilizing heterodyne receiver principles and being suitable for practicing the invention of the present application. The police radar detector 100 includes two input stages 102, 104 which are substantially the same so that only the input stage 102 will be described herein. The input stages 102, 104 correspond to a front channel and a rear channel, respectively. Operation of the radar detector 100 using the two input stages 102, 104, or the front and rear channels, is for detecting police radar signals and determining the directional origin of the signals as taught in U.S. Pat. No. 5,083,129 which is assigned to the same assignee as the present application and is incorporated herein by reference.

The input stage 102 includes an antenna 106, such as a microwave horn, for receiving incoming electromagnetic signals. The antenna 106 is coupled to a first mixer 108 and preamplification circuitry comprising an X band and $K_u$ band preamplifier 110 by a diplexer 112. In the illustrated embodiment of the police radar detector 100, the diplexer 112 comprises a K band and $K_a$ band rejection filter 113 which rejects frequencies in a band extending from approximately 24 gigahertz (Ghz) to approximately 36 Ghz. The first mixer 108 as illustrated comprises a pair of antiparallel diodes having a near side 108A coupled to the antenna 106 by the diplexer 112 and a high pass filter 119 and a far side 108B coupled to a first intermediate frequency (IF) amplifier 114 through a passive multiplexer 116 and a first IF preamplifier 118. The first IF preamplifier 118 and first IF amplifier 114 pass signals low enough to encompass the second intermediate frequency, for the illustrated embodiment and hereinafter about 725 megahertz (Mhz). It is noted that the first IF amplifier 114 can be omitted from the police radar detector although some sensitivity would be lost. Also, the first IF amplifier 114 can be bypassed or a separate device handling the second intermediate frequency can be provided. These modifications are considered to be within the scope of the present invention.

The passive multiplexer 116 comprises: the high pass filter 119 coupled between the antenna 106 and the first mixer 108 for passing signals in the K band, i.e., from approximately 24.05 Ghz to approximately 24.25 Ghz, and the $K_a$ band, i.e., from approximately 33.40 Ghz to approximately 36.00 Ghz, to the near side 108A of the first mixer 108; a first bandpass filter 120 which is designed to pass frequencies in the X band, i.e., from approximately 10.50 Ghz to approximately 10.55 Ghz, and the $K_u$ band, i.e., from approximately 13.40 Ghz to approximately 13.50 Ghz, to the far side 108B of the mixer 108; and, a local oscillator or second bandpass filter 122 which is designed to pass first local oscillator (LO) signals to the far side 108B of the first mixer 108.

The first LO signals are generated by a first local oscillator (LO) 124 and amplified by an amplifier 126. In the illustrated embodiment, the first LO 124 comprises a voltage controlled oscillator (VCO) and generates signals which sweep in frequency from approximately 15.160 Ghz to approximately 14.310 Ghz (alternately from 15.160 Ghz to approximately 15.090 Ghz) for sweeping the X band; from approximately 15.160 Ghz to approximately 14.310 Ghz (effectively approximately 30.320 Ghz to 28.620 Ghz) for simultaneously sweeping portions of the K band and the $K_a$ band; and, approximately 14.225 Ghz to approximately 14.125 Ghz for sweeping the $K_u$ band. The high pass filter 119 substantially prevents LO signals from being passed to and broadcast from the antenna 106 by serving as a short to ground for the LO signals so that the LO drive is delivered substantially to the mixer diodes with relatively little LO power being delivered to the antenna 106. The passive multiplexer 116 also comprises a low pass filter 128 which is designed to pass frequencies from direct current (dc) to approximately 6 Ghz. The band reject filter 113, which forms the diplexer 112, can also be considered as forming part of the passive multiplexer 116 since the passive multiplexer 116 must perform the functions of interconnecting the antenna 106, the first LO 124, the first mixer 108 and the first IF amplifier 114 with minimal loss from each source of signals to its respective destination.

In the input stage topology, illustrated by the input stage 102, including the connection of the X band and $K_u$ band preamplifier 110 to the far side 108B of the mixer 108, the mixer 108 provides additional attenuation of any signals which may feedback toward the input of the X band and $K_u$ band preamplifier 110. Attenuation of these feedback signals reduces the possibility of oscillation of the X band and $K_u$ band preamplifier 110. The input stage topology all provides a very direct and low loss path for K band and $K_a$ band signals from the antenna 106 to the near side 108A of the mixer 108 which is believed to result in a favorable noise figure on the K and $K_a$ band. More conventional input stage connections recombine preamplified X band signals with a passive K band and $K_a$ band path and apply the recombined signals to a single terminal of the mixer. Such input stages or networks are believed to have higher insertion loss on the K and $K_a$ bands which leads to a commensurate increase in noise figure.

Figure 3:
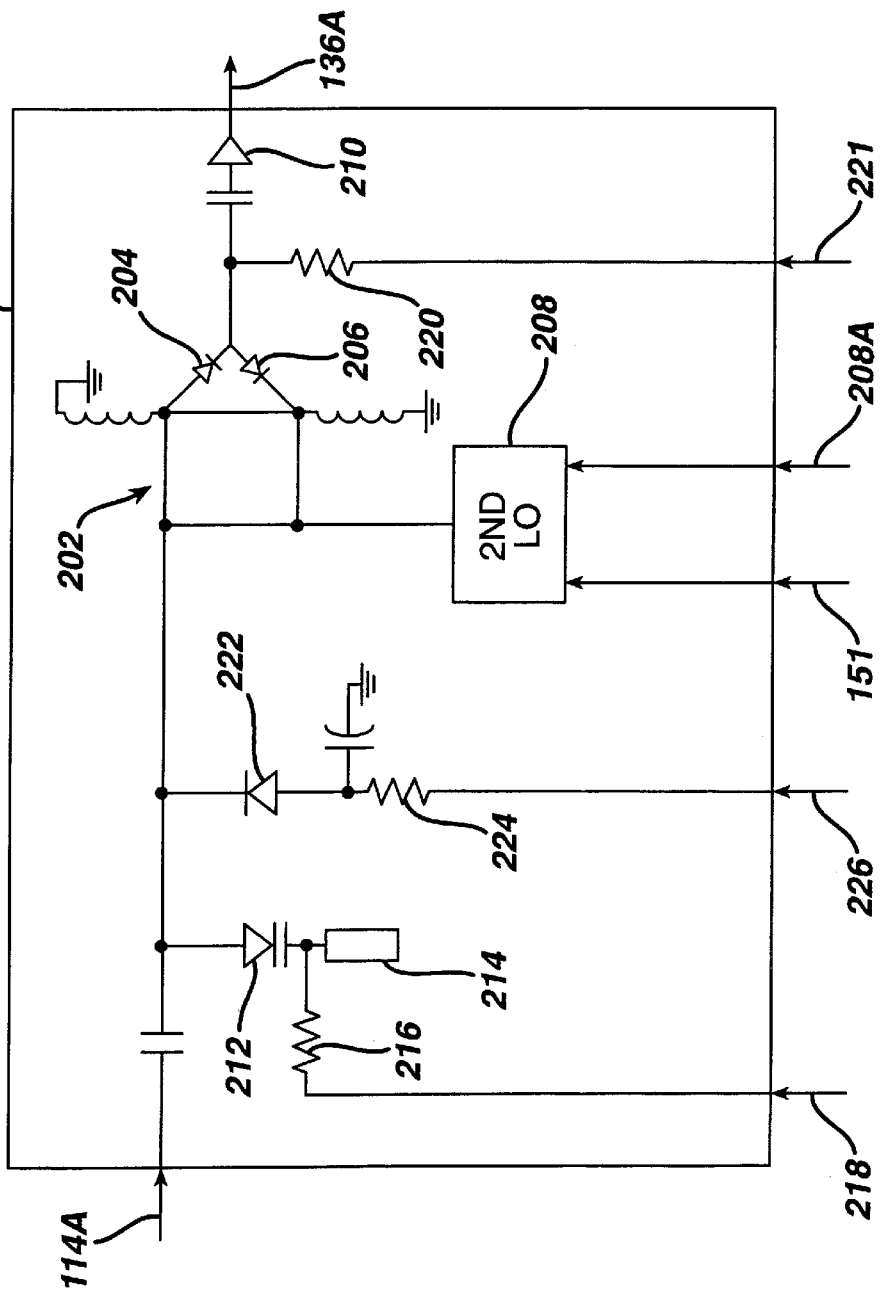
FIG. 3 is a schematic block diagram of the second mixer stage of the police radar detector of FIG. 1.

Signals from the first IF amplifier 114 are passed to a second mixer stage 200 via a conductor 114A, see FIG. 3. The second mixer stage 200 comprises a 900° hybrid circuit 202, a first diode 204 and a second diode 206 which together serve as a second mixer. The circuit 202 receives second LO signals generated by a second LO 208 having a frequency of approximately 5.325 Ghz in the illustrated embodiment when the second LO is active. Signals from the circuit 202 are passed to a second IF amplifier 210 and from there to a bandpass filter 136 via a conductor 136A. In the illustrated embodiment, both the second IF amplifier 210 and the bandpass filter 136 have a frequency of around 725 Mhz. The bandpass filter 136 is connected to a single sideband down converter 137 comprising a third 138 and a third LO 140 operating at about 725.3 Mhz to down convert signals to approximately 300 kilohertz (Khz). The single sideband down conversion avoids degradation of the system noise figure by approximately 3 dB. The circuitry beyond the second mixer forms detector circuitry for detecting electromagnetic signals in the scanned radar bands.

A 300 Khz bandpass filter 142 passes signals from the down converter 137 to an amplitude detector and frequency modulation (FM) detector circuit 144, sometimes referred to as a discriminator or demodulator circuit, which operates in a manner disclosed in U.S. Pat. No. 5,068,663, which is assigned to the same assignee as the present application and is incorporated herein by reference. The FM output or frequency demodulation detection signal from the circuit 144 is passed to the third LO 140 to lock the radar detector 100 onto incoming electromagnetic signals and also to signal conditioning and control circuitry 146 which includes a processor, preferably any one of a number of appropriate microprocessors.

Modulation circuitry 148, comprising a summer 150 and a 90° phase shifter circuit 152, is coupled between the signal conditioning and control circuitry 146 6and the first LO 124 to connect a first modulation signal to the first local oscillator 124. A second modulation signal, generated by the signal conditioning and control circuitry 146, is connected directly to the second local oscillator 208 via a conductor 151. Upon detecting a valid radar signal, i.e., a radar signal in one of the X, $K_u$, K or $K_a$ bands, the signal conditioning and control circuitry 146 activates alarm circuits 154 which can be audible, visual including numeric, directional arrows, or other appropriate for a given alerting arrangement in a known manner.

With the understanding of the radar detector 100 gained from the above overview, various aspects of the radar detector 100 will now be described in more detail. The frequencies that are scanned to cover the bands of interest are: the X band —10.50 Ghz to 10.55 Ghz; the $K_u$ band —13.40 Ghz to 13.50 Ghz; the K band—24.05 Ghz to 24.25 Ghz; and, the $K_a$ band—33.40 Ghz to 36.00 Ghz. The frequency scheme of the radar detector 100, i.e., the frequencies used within the police radar detector including frequencies or swept frequency bands of local oscillators and frequencies of intermediate amplifiers and the tuning methods, provides for sweeping portions of first and second police radar bands, the K band and the $K_a$ band, during a single sweep of the first LO signal generated by the first LO 124 under the control of the signal conditioning and control circuitry 146.

In particular, a 725 MHz second IF amplifier 210 in conjunction with the 5.325 Ghz second LO 208 lead to potential reception of signals at 4.600 Ghz and 6.050 Ghz, i.e., 5.325 Ghz±725 Mhz, in the first IF amplifier 114 and the first IF preamplifier 118. In the present invention, one of these responses is suppressed so that the radar detectors noise figure is not degraded. Each of these two IF responses, 4.600 Ghz and 6.050 Ghz, combine with the first LO signals from the first LO 124 to yield a total of four receive frequencies, i.e., first LO±4.600 Ghz and first LO±6.050 Ghz. Sideband suppression circuitry comprises a varactor 212 which is tuned by a floating stub 214 and a dc bias or signal suppression signal applied by the signal conditioning and control circuitry 146 via a conductor 218 through a resistor 216 to select the desired sideband and suppress noise in the undesired image sideband. Thus, through sideband suppression, the 4.600 Ghz or 6.050 Ghz response is selected such that two sweeps of the first LO 124 are required to scan the K band and the $K_a$ band.

Reference should now be made to Table 1 which details the frequencies adopted in the illustrated embodiment of the radar detector 100. Each row in Table 1 is labeled with a reference number, i.e., rows 1–10, in the first column. In rows 1–4, the first LO 124 signal (Fvco) is swept from approximately 15.160 Ghz to approximately 14.310 Ghz as shown in the second column of Table 1. But, in the harmonic operating mode of the first mixer 108 of rows 1–4, the local oscillator frequency is inherently doubled to yield injection of first local oscillator signals (Fl) having frequencies which are swept from 30.320 Ghz to 28.620 Ghz as shown in column three. The frequency doubling is due to the antiparallel diodes of the first mixer 108 conducting on alternate half-cycles of the LO signal from the first LO 124 in the harmonic operating mode. In rows 5–8, the first LO 124 signal (Fvco) preferably is swept from approximately 15.160 Ghz to approximately 15.090 Ghz; however, a sweep from approximately 15.160 Ghz to approximately 14.310 Ghz may also be used.

The fourth column in each row shows the four different functions or equations which describe frequency conversion from the frequency of received electromagnetic signals (Frf) to the output (F3) of the second IF amplifier 210 at approximately 725 Mhz. The fifth column lists the corresponding frequency ranges of incoming electromagnetic signals Frf that are searched as the first LO 124 is swept across its tuning bandwidth. The sixth or Coverage column of Table 1 shows the particular radar bands or portions of bands which are covered by the receiver responses. The seventh column of Table 1 shows the frequency equations of the third column of Table 1 solved for the second IF amplifier 210 output, F3. These relationships are repeated for convenience in Table 2 which will be referred to later herein. The eighth and ninth columns of Table 1 show the 1st and 2nd intermediate frequencies with the 1st IF frequencies changing between 6.050 Ghz and 4.600 Ghz depending on which sideband is being suppressed.

To provide coverage of the X band/$K_u$ band, the operating mode of the first mixer 108 is switched between the K band/$K_a$ band operating mode and the X band/$K_u$ band operating mode by band switching circuitry 157 comprising a resistor 156 and a conductor 158 which extends between the signal conditioning and control circuitry 146 and the X band and $K_u$ band preamplifier 110. The signal conditioning and control circuitry 146 is thereby able to apply a direct current (dc) bias to the diodes which make up the first mixer 108 through the low pass filter 128, i.e., to the far side of the first mixer 108. The dc bias upsets the balance of the diodes which make up the first mixer 108 so that one of the diodes is forward biased and the other diode is reversed biased.

This dc bias causes the first mixer 108 to mix more efficiently with the fundamental of the applied first LO signals rather than the second harmonic of the signals generated by the first LO 124. The dc bias also enables the X band and $K_u$ band preamplifier 110 which is disabled during the K band/$K_a$ band operating mode.

The changed operating mode for X band/$K_u$ band reception is indicated in rows 5–10 of Table 1, rows 5–8 for the X band and rows 9–10 for the $K_u$ band. Note that for the X band, four responses again are generated; however, only the response of row 7 provides a signal of interest. Accordingly, the sensitivity of responses in rows 5 and 8 is reduced by suppression of the 6.050 Ghz sideband and, to further reduce noise within he radar detector 100, the X band and $K_u$ band preamplifier 110 may be designed to uppress the unwanted responses of row 6.

For $K_u$ band reception, the mixing operations of the second mixer stage 200 are stopped by disabling the second LO 208 via a conductor 208A and providing current through a resistor 220 via a conductor 221 to forward bias the diode 206 and thereby bypass the second mixer. The desired signal is then converted directly to 725 Mhz and passed through the forward biased diode 206 to the bandpass filter 136. The response of row 10 contributes image noise which may be attenuated by selectivity in the X band and $K_u$ band preamplifier 110. The state of the sideband suppression signal on the conductor 218 is generally irrelevant during the $K_u$ band scanning. It is noted, however, that one or the other of the two states of the sideband suppression circuitry may be preferred dependent on the $K_u$ band tuning characteristics if that state enhances $K_u$ band tuning.

During operation of the police radar detector 100 to detect the X, K and $K_a$ bands with the second mixer stage 200 driven by the 5.325 Ghz signal from the second LO 208, the 725 Mhz response causes a problem. Noise from the front end at 725 Mhz bleeds through the second mixer stage 200 overlaying the desired signals and degrading the noise figure by raising the noise floor. To overcome this problem, a noise suppression circuit comprising a PIN diode 222 is provided. The PIN diode 222 is forward biased through a resistor 224 via a conductor 226 during all modes employing 5.325 Ghz mixing to shunt the 725 Mhz noise. During $K_u$ band operation, the diode 222 is reverse biased so that the 725 Mhz signals can be processed.

During operation of the police radar detector 100 in the X, K and $K_a$ bands, first IF frequencies are either 4.600 Ghz or 6.050 Ghz. The present invention offers noise figure improvement by alternately suppressing one of these responses while passing the other. For example, if the first IF amplifier 114 delivers output noise power substantially above room temperature (300° K) with equal contributions at 4.600 Ghz and 6.050 Ghz, then a 3 dB improvement accrues by suppressing the undesired sideband. The selected first IF sideband in turn gives rise to two RF responses. Thus, a 6.050 Ghz IF yields two receiver responses about 12 Ghz apart, allowing 24.270 Ghz and 36.370 Ghz to be tuned simultaneously (rows 1 and 4), and a 4.600 Ghz IF yields two receiver responses about 9 Ghz apart, allowing 24.720 Ghz and 34.920 Ghz to be tuned simultaneously (rows 2 and 3). By extension, using two responses, e.g., at 6.050 Ghz and 4.600 Ghz, allows the $K_a$ band to be covered with reduced vco tuning bandwidth.

During operation of the police radar detector 100 in the X band, the X band and $K_u$ band preamplifier 110 precedes the first mixer 108 potentially delivering noise at an image frequency that could degrade noise figure. The image occurs at 19.7 Ghz, see row 6 of Table 1, and sideband suppression is again appropriate. The design of the X band and $K_u$ band preamplifier 110 can incorporate selectivity that attenuates the image noise thereby avoiding degraded noise figure.

In contrast, there is little benefit to performing single sideband reception forward of the first mixer if the front end is passive, i.e., no preamplifier precedes the first mixer 108for example, during operation of the police radar detector 100 in the K and $K_a$ bands. There is no significant noise power at the output of the first mixer 108 associated with the undesired sideband, i.e., noise power is near room temperature, such that nothing is gained by suppressing one of the sidebands. Rather, in the police radar detector 100 of the present application, the double sideband front end response is beneficial since it provides coverage of two frequencies of interest simultaneously. System sensitivity improves because, for a given detection bandwidth, the required spectrum can be inspected more frequently offering more opportunity for detection.

It is noted that in the process of covering the 2.6 Ghz wide $K_a$ band, the receiver also scans other frequencies where unwanted signals may be generated and these signals must ultimately be ignored. The ability to ignore these unwanted signals is performed by a combination of frequency calibration of the first LO 124, i.e., the point in the sweep at which a signal is detected is monitored as disclosed in referenced U.S. Pat. No. 5,068,663; and, by being able to identify the active mixer sidebands as will now be described.

An important feature of most radar detectors is the ability not only to generate a warning or alert when a radar signal is received, but also to identify the radar band in which the signal originates. When a signal is received in the radar detector 100, the frequency of the first LO 124 is known because of calibration of the first LO 124, i.e., the point in the sweep of the first LO 124 at which a signal is detected is noted by the signal conditioning and control circuitry 146 as described above. However, for the X, K and $K_a$ bands, four frequency conversion paths are provided with two being active simultaneously in the police radar detector 100 and the other two being moderately attenuated by sideband suppression (for the $K_u$ band, two frequency conversion paths are active simultaneously) so it is not immediately apparent which receiver response is producing the signal. This ambiguity in the received frequency must be resolved in order to uniquely identify the origin of an incoming signal.

The circuit 144 includes an FM detector which generates a frequency demodulation detection signal as its output. If a modulation signal, such as a 500 hertz sine wave, is applied for example to the second LO 210, the modulation will be superimposed upon the received signal and will appear at the FM detector output 160. The detected modulation will be either in phase or 180° out of phase with the applied modulation, depending on whether the signal path was the upper sideband or the lower sideband of the second mixer. Analogous results occur if modulation is applied to the first LO 124. Thus, if a modulation signal, such as a 500 hertz sine wave, is applied to the first LO 124, the modulation will be superimposed upon the received signal and will appear at the FM detector output 160. Again, the detected modulation will be either in phase or 180° out of phase with the applied modulation, depending on whether the signal path was the upper sideband or the lower sideband of the first mixer. These operations are illustrated in Table 2 which shows the frequency conversion equations of the fourth column of Table 1 solved for the IF output frequency, F3, i.e., the second IF.

Examining the response of row 3, for example, if frequency modulation is applied to the first LO 124, increasing F1 produces decreasing F3. The detected frequency modulation would thus be 180° out of phase with the applied modulation. Conversely, modulating the second LO 132 upward in frequency would generate increasing F3. Thus, detected FM would be in phase with modulation applied to F2. Stated differently, the partial derivatives or slopes of F3 with respect to F1 and F2 are −1 and +1, respectively. These slopes for the receiver responses are tabulated in Table 2. Inspection reveals four different combinations for the X, K and $K_a$ bands that in 2-bit binary fashion determine the active signal path. For the $K_u$ band, slope F3/F1 alone determines the active signal path.

TABLE 1

Receiver Frequency Scheme

| Ref. | Fvco | F1 | Frf Function | Frf | Coverage | IF Function | 1st IF | 2nd IF |
|---|---|---|---|---|---|---|---|---|
| 1) | 15.160 → 14.310 | 30.320 → 28.620 | Frf = F1 + F2 + F3 | 36.370 → 34.670 | Top of Ka | F3 = Frf − F1 − F2 | 6.050 | 0.725 |
| 2) | 15.160 → 14.310 | 30.230 → 28.620 | Frf = F1 + F2 − F3 | 34.920 → 33.220 | Bottom of Ka | F3 = −Frf + F1 + F2 | 4.600 | 0.725 |
| 3) | 15.160 → 14.310 | 30.320 → 28.620 | Frf = F1 − F2 + F3 | 25.720 → 24.020 | K | F3 = Frf − F1 + F2 | 4.600 | 0.725 |
| 4) | 15.160 → 14.310 | 30.320 → 28.620 | Frf = F1 − F2 − F3 | 24.270 → 22.570 | Interference & K | F3 = −Frf + F1 − F2 | 6.050 | 0.725 |
| 5) | 15.160 → 15.090 | 15.160 → 15.090 | Frf = F1 + F2 + F3 | 21.210 → 21.140 | Of no interest | F3 = Frf − F1 − F2 | 6.050 | 0.725 |
| 6) | 15.160 → 15.090 | 15.160 → 15.090 | Frf = F1 + F2 − F3 | 19.760 → 19.690 | Of no interest | F3 = −Frf + F1 + F2 | 4.600 | 0.725 |
| 7) | 15.160 → 15.090 | 15.160 → 15.090 | Frf = F1 − F2 + F3 | 10.560 → 10.490 | X | F3 = Frf − F1 + F2 | 4.600 | 0.725 |
| 8) | 15.160 → 15.090 | 15.160 → 15.090 | Frf = F1 − F2 − F3 | 9.110 → 9.040 | Of no interest | F3 = −Frf + F1 − F2 | 6.050 | 0.725 |
| 9) | 14.225 → 14.125 | 14.225 → 14.125 | Frf = F1 − F3 | 13.500 → 13.400 | Ku | F3 = −Frf + F1 | 0.725 | |
| 10) | 14.225 → 14.125 | 14.225 → 14.125 | Frf = F1 + F3 | 14.950 → 14.850 | Of no interest | F3 = Frf − F1 | 0.725 | |

F1 is the first mixer local oscillator injection and is 2*Fvco in Responses 1–4; F1 = Fvco in responses 5–10.
F2 is the second mixer local oscillator frequency (5.325 Ghz).
F3 is the second intermediate amplifier frequency (725 Mhz).

TABLE 2

FM Detection Phase

| Ref. | IF Function | Slope F3/F1 | F3/F2 |
|---|---|---|---|
| 1) | F3 = Frf − F1 − F2 | −1 | −1 |
| 2) | F3 = −Frf + F1 + F2 | +1 | +1 |
| 3) | F3 = Frf − F1 + F2 | −1 | +1 |
| 4) | F3 = −Frf + F1 − F2 | +1 | −1 |
| 5) | F3 = Frf − F1 − F2 | −1 | −1 |
| 6) | F3 = −Frf + F1 + F2 | +1 | +1 |
| 7) | F3 = Frf − F1 + F2 | −1 | +1 |
| 8) | F3 = −Frf + F1 − F2 | +1 | −1 |
| 9) | F3 = −Frf + F1 | +1 | 0 |
| 10) | F3 = Ffr − F1 | −1 | 0 |

When a signal is acquired, the signal conditioning and control circuitry 146 of the radar detector 100 performs these operations to identify the active frequency conversion function. Measurement is accomplished in an economical manner by employing orthogonal modulation at the two local oscillators that is analogous to quadrature phase shift keying (QPSK) used in data communication. Synchronous quadrature correlation of the detected frequency modulation yields either positive or negative correlation with each local oscillator. The correlations correspond directly to the aforementioned slopes, thus resolving the frequency ambiguity. It is therefor apparent that −1, −1 and +1, +1 identify a detected incoming signal as being in the $K_a$ band while −1, +1 and +1, −1 identify a detected incoming signal as being in the K band. When detecting X band, −1, +1 identify a detected incoming signal as being in the X band. When detecting the $K_u$ band, +1 (slope F3/F1) identifies a detected incoming signal as being in the $K_u$ band.

Figure 2:
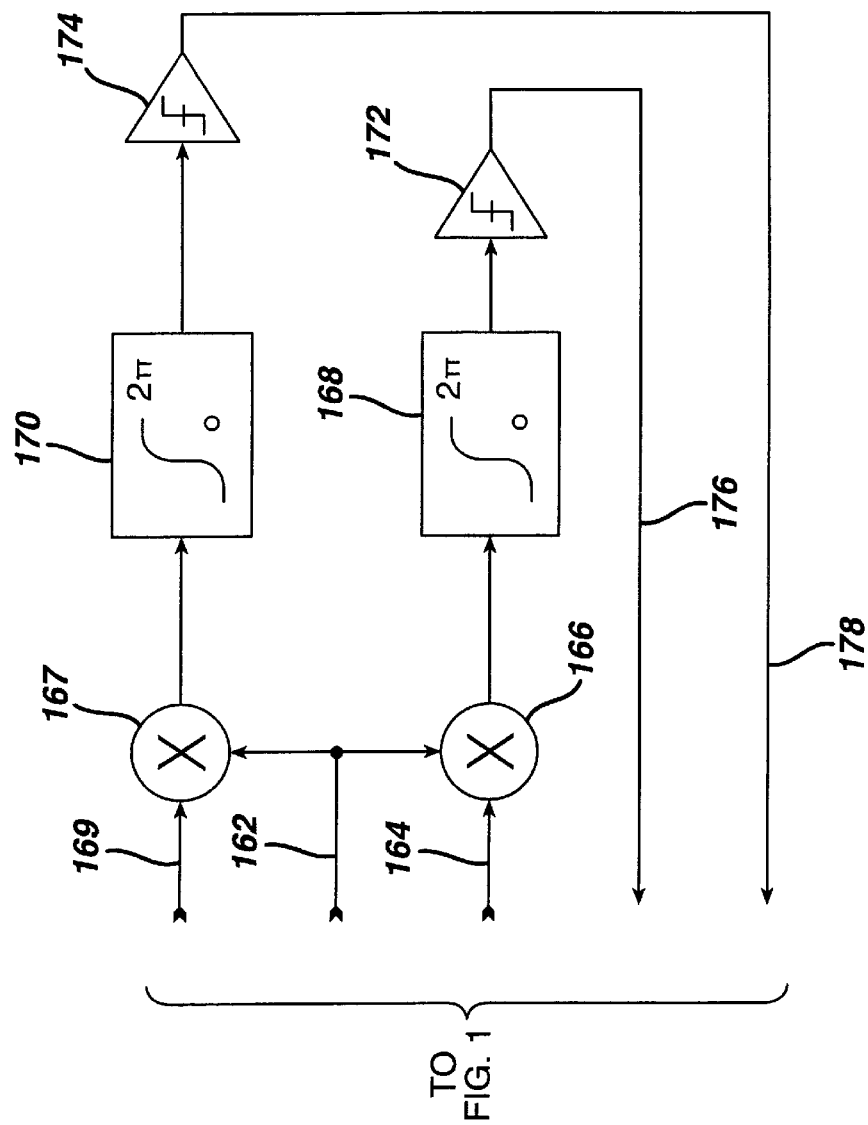
FIG. 2 is a schematic block diagram illustrating quadrature correlation for the resolution of frequency ambiguities in the police radar detector of FIG. 1.

A hardware implementation of quadrature correlation is conceptually illustrated in the schematic block diagram of FIG. 2. The signal conditioning and control circuitry 146 of the police radar detector 100 generates a 500 Hz sine wave which is passed through the modulation circuitry 148 to result in a first modulation signal being applied to the first LO 124 with the 500 Hz signal serving as a second modulation signal which is applied to the second LO 210. Thus, the first and second modulation signals are in quadrature to one another.

Correlated detection is performed by multiplying or mixing the detected FM signal on a conductor 162 with the 500 Hz signal generated by the signal conditioning and control circuitry 146 on a conductor 164 in a mixer circuit 166 and integrating the result over one or more integer periods of the modulation in a first integrator circuit 168; and, mixing the detected FM signal on the conductor 162 in a mixer 167 with the 500 Hz signal which has been shifted by −90° on the conductor 169 and integrating the result over one or more integer periods of modulation in a second integrator circuit 170. The output signals from the integrator circuits 168 and 170 are passed through threshold circuits 172, 174, respectively, to generate the +1 or −1 slopes which are sent to the signal conditioning and control circuitry 146 on conductors 176, 178 where the operations described above are performed to determine the radar bands of received electromagnetic signals.

It is well known from modem theory that the quadrature modulation arrangement allows two independent data bits to be transmitted simultaneously. In analogous fashion, the quadrature modulation arrangement permits characterization of both frequency conversions simultaneously and operates with an economy of hardware and signal analysis time. While a hardware implementation is shown in FIG. 2, the synchronous quadrature correlation for the radar detector 100 is preferably implemented by digitizing the detected FM signal and performing the multiplications and integrations numerically in software within a microprocessor of the signal conditioning and control circuitry 146.

The quadrature correlation technique is very economical since the 90° phase shifter circuit 152 can be constructed in a conventional manner using only one capacitor and a few resistors and the quadrature detection requires only additional software for performing operations corresponding to the operations performed by the hardware of FIG. 2. While the above described modulation/quadrature correlation techniques are preferred for the radar detector 100, it is apparent that other modulation techniques can also be utilized. For example, modulation signals having different frequencies can be applied to one or both mixers.

By using the above described techniques, the frequency of any signal detected by the radar detector 100 can be uniquely identified. A review of rows 1–4 of Table 1 shows that some portions of the K band, from 24.020 Ghz to 24.270 Ghz, and some portions of the $K_a$ band, from 34.670 Ghz to 34.920 Ghz are scanned twice because of overlapping frequency coverage. Accordingly, indiscriminate counting of valid K and $K_a$ band responses would lead to some double counting of signals lying within the overlapping regions. To overcome these counting problems, the radar detector 100 is characterized during manufacturing to determine the A/D codes of the sweep signals corresponding to 34.670 Ghz in row 2 and 35.920 Ghz in row 1. The measured codes are stored so that they can be used in connection with band identification to avoid double counting of signals within the overlapping regions. Double counting of K band signals is precluded by simply ignoring K band signals received in the responses of row 4 of Table 1. This signal identification permits determination of the accurate number of radar sources incident on the radar detector 100 so that the user of the radar detector 100 can be notified. Detection and alerting of multiple radar sources is described in U.S. Pat. No. 5,146,226 which is assigned to the same assignee as the present application and is incorporated herein by reference.

Additional details regarding operation of the preferred embodiment of the radar detector 100 can be determined by review of U.S. Pat. Nos. 5,852,417; 5,856,80; 5,900,832; and, 5,917,441 which are assigned to the same assignee as the present application and are incorporated herein by reference.

Having thus described the invention of the present application in detail and by reference to preferred embodiments thereof, it will be apparent that modifications and variations are possible without departing from the scope of the invention defined in the appended claims. For example, while the second IF is preferably selected as illustrated at 725 Mhz to help minimize the tuning bandwidth required for the first LO, other second IF frequencies can be employed in the present invention.

What is claimed is:

1. A police radar detector comprising:
    an antenna for receiving incoming electromagnetic signals;
    a first local oscillator generating a first local oscillator signal which is swept through a first range of frequencies to sweep the X, K and $K_a$ radar bands and a second range of frequencies to sweep the $K_u$ radar band;
    a first mixer coupled to said antenna and said first local oscillator for mixing said incoming electromagnetic signals with said first local oscillator signal to generate first intermediate frequency signals;
    a second local oscillator for generating a second local oscillator signal;
    a second mixer coupled to said first mixer for mixing said first intermediate frequency signals with said second local oscillator signal to generate second intermediate frequency signals at a second intermediate frequency;
    detector circuitry coupled to said second mixer for detecting received electromagnetic signals within the X, $K_u$, K and $K_a$ radar bands; and
    signal conditioning and control circuitry for selectively enabling said second local oscillator when said X, K and $K_a$ radar bands are swept and disabling said second local oscillator and bypassing said second mixer when said $K_u$ radar band is swept.

2. A police radar detector as claimed in claim 1 further comprising a first intermediate frequency amplifier passing signals encompassing said second intermediate frequency and amplifying said first intermediate frequency signals, said first intermediate frequency amplifier coupling said first mixer to said second mixer which then mixes amplified first intermediate frequency signals with said second local oscillator signal.

3. A police radar detector as claimed in claim 1 wherein said second intermediate frequency is about 725 megahertz.

4. A police radar detector as claimed in claim 3 wherein said first range of frequencies comprises about 14.310 gigahertz to about 15.160 gigahertz.

5. A police radar detector as claimed in claim 4 wherein said first range of frequencies comprises about 14.310 gigahertz to about 15.160 gigahertz for the K and $K_a$ radar bands and a subrange of frequencies comprising about 15.090 gigahertz to about 15.160 gigahertz for the X radar band.

6. A police radar detector as claimed in claim 4 wherein said second range of frequencies comprises about 14.125 gigahertz to about 14.225 gigahertz.

7. A police radar detector as claimed in claim 1 wherein said second mixer comprises a 90° hybrid circuit, a first diode and a second diode connected to said 90° hybrid circuit.

8. A police radar detector as claimed in claim 7 wherein one of said first and second diodes is forward biased by said signal conditioning and control circuitry to bypass said second mixer when said $K_u$ radar band is swept.

9. A police radar detector as claimed in claim 1 further comprising sideband suppression circuitry for selecting an upper sideband signal or a lower sideband signal from said first intermediate frequency signal when said detector is sweeping the X, K and $K_a$ radar bands.

10. A police radar detector as claimed in claim 9 wherein said second intermediate frequency is about 725 megahertz, said upper sideband signal is around 6.050 gigahertz and said lower sideband signal is around 4.600 gigahertz.

11. A police radar detector as claimed in claim 9 wherein said sideband suppression circuitry comprises a varactor controlled by said signal conditioning and control circuitry to select said upper sideband or said lower sideband.

12. A police radar detector as claimed in claim 1 further comprising a noise suppression circuit which suppresses noise around said second intermediate frequency when said X, K and $K_a$ radar bands are swept.

13. A police radar detector as claimed in claim 12 wherein said noise suppression circuit comprises a diode coupled between said signal conditioning and control circuitry and an input of said second mixer stage, said diode being forward biased when said X, K and $K_a$ radar bands are swept and being reversed biased when said $K_u$ radar band is swept.

14. A police radar detector as claimed in claim 12 wherein said second intermediate frequency is about 725 megahertz.

15. A police radar detector comprising:
an antenna for receiving incoming electromagnetic signals;
a first local oscillator generating a first local oscillator signal which is swept through a range of frequencies to sweep the X, K and $K_a$ radar bands;
a first mixer coupled to said antenna and said first local oscillator for mixing said incoming electromagnetic signals with said first local oscillator signal to generate first intermediate frequency signals;
a second local oscillator for generating a second local oscillator signal;
a second mixer coupled to said first mixer for mixing said first intermediate frequency signals with said second local oscillator signal to generate second intermediate frequency signals at a second intermediate frequency;
detector circuitry coupled to said second mixer for detecting received electromagnetic signals within the X, K and $K_a$ bands;
sideband suppression circuitry for suppressing an upper sideband signal or a lower sideband signal from said first intermediate frequency signal when said detector is sweeping the X, K and $K_a$ radar bands; and
signal conditioning and control circuitry for selectively enabling said sideband suppression circuitry for selectively enabling suppression of said upper sideband or said lower sideband.

16. A police radar detector as claimed in claim 15 further comprising a first intermediate frequency amplifier passing signals encompassing said second intermediate frequency and amplifying said first intermediate frequency signals, said first intermediate frequency amplifier coupling said first mixer to said second mixer which then mixes amplified first intermediate frequency signals with said second local oscillator signal.

17. A police radar detector as claimed in claim 16 wherein said range of frequencies used to sweep the X, K and $K_a$ bands comprises a first range of frequencies, said first local oscillator is swept through a second range of frequencies to sweep the $K_u$ radar band, said first intermediate frequency amplifier encompasses said second intermediate frequency and said detector circuitry further detects received electromagnetic signals within the $K_u$ radar band, said signal conditioning and control circuitry further selectively enabling said second local oscillator when said X, K and $K_a$ bands are swept and disabling said second local oscillator and bypassing said second mixer when said $K_u$ band is swept and wherein said second mixer comprises a 90° hybrid circuit, a first diode and a second diode connected to said 90° hybrid circuit.

18. A police radar detector as claimed in claim 17 wherein one of said first and second diodes is forward biased by said signal conditioning and control circuitry to bypass said second mixer when said $K_u$ band is swept.

19. A police radar detector as claimed in claim 15 wherein said second intermediate frequency is about 725 megahertz, said upper sideband signal is around 6.050 gigahertz and said lower sideband signal is around 4.600 gigahertz.

20. A police radar detector as claimed in claim 19 wherein said range of frequencies comprises about 14.310 gigahertz to about 15.160 gigahertz.

21. A police radar detector as claimed in claim 20 wherein said range of frequencies comprises about 14.310 gigahertz to about 15.160 gigahertz for the K and $K_a$ radar bands and a subrange of said range of frequencies comprising about 15.090 gigahertz to about 15.160 gigahertz for the X radar band.

22. A police radar detector as claimed in claim 15 wherein said sideband suppression circuitry comprises a varactor controlled by said signal conditioning and control circuitry to select said upper sideband or said lower sideband.

* * * * *

UNITED STATES PATENT AND TRADEMARK OFFICE
CERTIFICATE OF CORRECTION

PATENT NO.    : 6,175,324 B1
DATED         : January 16, 2001
INVENTOR(S)   : Michael David Valentine; Stephen Ray Scholl; and Harry Joe Gould It is certified that error appears in the above-identified patent and that said Letters Patent is hereby corrected as shown below:

Column 4,
Line 44, "hom" should read -- horn --.

Column 5,
Line 64, "900" should read -- 90 --.

Column 6,
Line 5, "third 138" should read -- third mixer 138 --.
Line 27, "circuitry 146 6and" should read -- circuitry 146 and --.

Column 7,
Line 61, "Ku. .band." should read -- Ku. band. --.
Line 66, "he radar" should read -- the radar --.
Line 67, "uppress" should read -- suppress --.

Column 8,
Line 55, "108for" should read -- 108, for --.

Signed and Sealed this

Twelfth Day of March, 2002

Attest:

JAMES E. ROGAN
*Attesting Officer*    *Director of the United States Patent and Trademark Office*